United States Patent [19]
De Armas et al.

[11] Patent Number: 5,864,819
[45] Date of Patent: Jan. 26, 1999

[54] INTERNAL WINDOW OBJECT TREE METHOD FOR REPRESENTING GRAPHICAL USER INTERFACE APPLICATIONS FOR SPEECH NAVIGATION

[75] Inventors: Mario E. De Armas, West Palm Beach; Harvey M. Ruback, Loxahatchee, both of Fla.

[73] Assignee: International Business Machines Corporation, Armonk, N.Y.

[21] Appl. No.: 745,282

[22] Filed: Nov. 8, 1996

[51] Int. Cl.⁶ ....................................................... G10L 5/06
[52] U.S. Cl. ........................................... 704/275; 704/270
[58] Field of Search ................................... 704/231, 275, 704/200, 270

[56] References Cited

U.S. PATENT DOCUMENTS

| | | | |
|---|---|---|---|
| 4,821,211 | 4/1989 | Torres | 345/357 |
| 5,263,117 | 11/1993 | Nadas et al. | 704/200 |
| 5,374,924 | 12/1994 | McKiel, Jr. | 340/825.19 |
| 5,386,494 | 1/1995 | White | 704/275 |
| 5,412,776 | 5/1995 | Bloomfield et al. | 345/346 |
| 5,461,399 | 10/1995 | Cragun | 345/145 |

FOREIGN PATENT DOCUMENTS

| | | |
|---|---|---|
| 9523362 | 2/1996 | Australia . |
| 627691 | 12/1994 | European Pat. Off. . |
| 02281326 | 11/1990 | Japan . |
| 07325797 | 12/1995 | Japan . |
| WO9518413 | 7/1995 | WIPO . |

OTHER PUBLICATIONS

IBM® Technical Disclosure Bulletin, vol. 37, No. 03, Mar. 1994; Multimedia Mixed Object Envelopes Supporting a Graduated Fee Scheme via Encryption.

(Abstract) An Efficient Data Management Method for Spatial Objects Using MD–tree–experimental evaluation and comparisons {IN Proceedings. 11th IAPR International Conference on Pattern Recognition. vol. III, Conference C: Image, Speech and Signal Analysis, The Hague, Netherlands, Aug. 30–Sep. 3, 1992}; Authors: Y. Nakamura, S. Abe, Y. Ohsawa; M. Sakauchi.

*Primary Examiner*—David R. Hudspeth
*Assistant Examiner*—Susan Wieland
*Attorney, Agent, or Firm*—Quarles & Brady

[57] ABSTRACT

Method for representing a target software application program to a voice recognition navigator program on a computer system. The method requires analyzing an application program to determine a plurality of application states. Each of the application states is defined as a set of window objects within the application for performing a specific user task. According to the invention, each of the application states is preferably represented by a sub-context tree, comprised of a plurality of sub-context objects. The tree allows the navigator to associate decoded spoken commands to specific window objects.

17 Claims, 12 Drawing Sheets

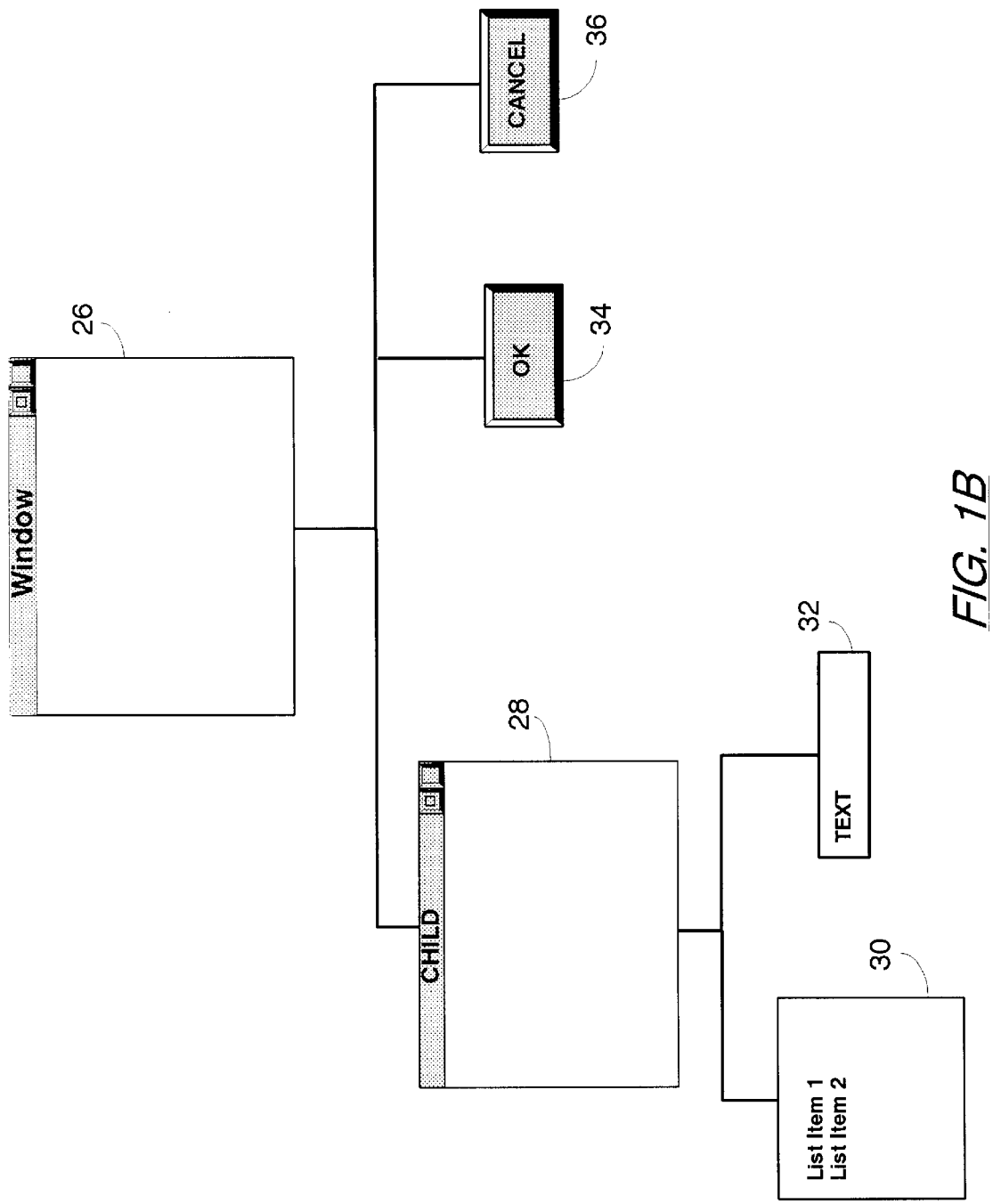

5,864,819

INTERNAL WINDOW OBJECT TREE METHOD FOR REPRESENTING GRAPHICAL USER INTERFACE APPLICATIONS FOR SPEECH NAVIGATION

BACKGROUND OF THE INVENTION

1. Technical Field

This invention relates to the field of computer software systems and more specifically to a method for allowing representation of a software application's window hierarchy in an efficient internal format for a speech navigator.

2. Description of the Related Art

In recent years, various software systems have been developed to enable an application program running on a computer to recognize and respond to voice commands. Such programs are advantageously designed as independent or stand-alone systems which are designed to provide voice recognition capabilities to existing commercially available target application programs. Thus, sophisticated voice recognition capability can be economically made available for a wide variety of commercial application software, without modifying the existing source code of such application software.

Voice recognition systems are designed to allow user data to be entered in a target application program by means of spoken words (e.g. dictation of a report in a word processing application program). In addition, some systems also enable such target application programs to respond to voice commands for controlling the software (e.g., opening and closing windows, choosing program options, and causing the application software to perform certain functions). Systems which allow voice control of a target application program are sometimes called voice navigators. Significantly, the design of an independently developed voice navigator system which is capable of associating voice commands with equivalent keyboard or mouse actuated control functions for a wide variety of commercially available application programs, has been hindered by certain difficulties.

Conventional voice navigation programs are typically designed to dynamically analyze an active window in order to determine the attributes of the various screen objects and determine a command vocabulary set for controlling such objects. In order to perform this dynamic analysis, there are several features of every window in a target application that the speech navigator can probe to determine the attributes of a particular object. These features include the (1) window class name, (2) window text, and (3) window identification number. The window class name indicates the type of the object (e.g., "BUTTON", "LISTBOX", "EDIT BOX", or "SCROLLBAR"). The window text feature is specific text associated with a window which allows a application program user to understand the function or relevance of a particular window. Conventional navigators will determine how to use the window text based upon the class name. For example, if the class name is "BUTTON" the window text of the button would be the words which would normally appear on the face of the button. Accordingly, the navigator would use the window text to determine the spoken command which can be used to activate the button. In other words, by probing the target application program regarding the window text, the navigator can associate certain spoken text to a particular button or control. Examples of window text might include words such as "OK" or "CANCEL" in the case of a push-button, or a list of items in the case of a list box. Finally, the navigator may also probe the application program for the window identification number as a way to internally distinguish controls which may otherwise look similar. The window identification number uniquely identifies a child window from other child windows having the same parent window.

Significantly, certain types of controls, such as "BUTTON", "LISTBOX", "EDIT BOX", or "SCROLLBAR" controls, are generic within the Windows operating systems, and may easily be recognized by the navigator when it dynamically probes a target application. However, when a target program developer has chosen to create certain custom controls in a particular application, such custom controls cannot share a generic class name such as those listed above. Consequently, navigator programs which rely upon such class names to distinguish these object types will not recognize the object as any known control, and will not therefore respond to any voice commands directed to such controls.

Further, conventional voice navigation programs base an active set of available voice commands on the currently active window and active control of the target program. For programs implemented in a Windows environment, this generally means that a computer user has access only to those voice actuated commands which are specifically associated with the particular window which has most recently been active or has been designated as the foreground window. Thus, if a user should wish to make use of a target application's command, button or other control that is not associated with a window which presently is considered to be the foreground window, it is necessary to first use a voice command to change the system status to cause a different window to be designated the foreground window. Only then will the voice command be recognized by the voice navigator system.

Further, because prior art voice navigators dynamically analyze the target application program to determine the specific words or phrases will actuate a particular window or control, they are generally constrained to allow only a single command or name for actuation or operation of a given control. This limits the flexibility of the voice navigator to the extent that it will not permit two or more commands from being available to operate a single control. Such prior art voice navigators are also limited in their ability to recognize custom user interface controls, such as buttons or list boxes, which may have been uniquely developed for use with a particular application. Although such custom controls may operate in a manner which is identical to standard controls, the custom controls will not be recognized by the navigator as such, unless the source code of the navigator is specifically modified to do so.

Finally, it has been found that certain types of menus and tool bars which may appear in a particular window of a target application, will never be treated as a foreground window, in an operating system sense, which would permit conventional voice navigators to recognize voice commands directed to such controls. This is a significant problem, as it will result in the voice navigator never being able to control the particular menu or tool bar.

Thus, it would be desirable to provide a method of representing the window object hierarchy and attributes internally, within a voice navigator application. In addition, it would be desirable to provide a method for internally representing a target application program to a voice navigator in a manner which would permit the voice navigator to control custom design controls of the target application. It would also be desirable to provide a method for internally representing a target application program to a voice navigator so as to permit the voice navigator to use controls in windows which are not presently designated as foreground windows. Finally, it would be desirable to provide a method for internally representing a window hierarchy of a target application program, to a voice navigator, without any recompiling of the source code of either the target application or the voice navigator.

SUMMARY OF THE INVENTION

A method for representing a target software application program to a voice recognition navigator program on a computer system. The method requires analyzing an application program to determine a plurality of application states. Each application state of a target application program is defined as a set of window objects within the application for performing a specific user task. The application states are preferably represented as a sub-context tree comprised of a plurality of sub-context objects, with each sub-context object representing a corresponding window object. The tree allows the navigator to associate decoded spoken commands to specific window objects.

A set of attributes is assigned to each of the sub-context objects within the sub-context tree. These attributes can include, but are not limited to a window class name, a window identification number, a window text string, and a window enumeration index value for a corresponding window object. Upon completion of the foregoing analysis, each of the sub-context trees is stored in an electronic memory device as a context data file in a computer system.

Once the foregoing information is stored in electronic memory, a voice navigator program can be executed on the computer system simultaneously with the target application program. The voice navigator program preferably accesses the information stored in electronic memory as sub-context trees, in order to match a current target application state to a corresponding sub-context tree. The information stored in the sub-context tree can be then be used to determine an active vocabulary set for the current target application state.

Once the active vocabulary has been retrieved by the voice navigator, it is preferably provided to a voice recognition engine software program, which will decode spoken utterances which correspond to the active vocabulary. Upon recognizing a spoken utterance, the voice recognition engine provides to the voice navigator a decoded phrase which is an element of the active vocabulary. The voice navigator program associates the decoded phrase with the sub-context object containing a vocabulary element corresponding to the decoded phrase. Finally, the desired action represented by the decoded phrase within the sub-context object is performed by the navigator by matching the sub-context object to a window object of the current application state.

BRIEF DESCRIPTION OF THE DRAWINGS

There are presently shown in the drawings embodiments which are presently preferred, it being understood, however, that the invention is not limited to the precise arrangements and instrumentalities shown, wherein:

FIG. 1(B) is an example of a tree which shows the hierarchical relationship of the top-level window object in FIG. 1(A) to its children.

DETAILED DESCRIPTION OF THE INVENTION

The present invention shall be described with respect to a Windows based operating system. It should be understood, however, that the invention as disclosed herein is not so limited. Instead, the invention can be used with voice navigators designed to operate with any one of several commercially available operating systems which incorporate a graphical user interface.

Figure 1A:
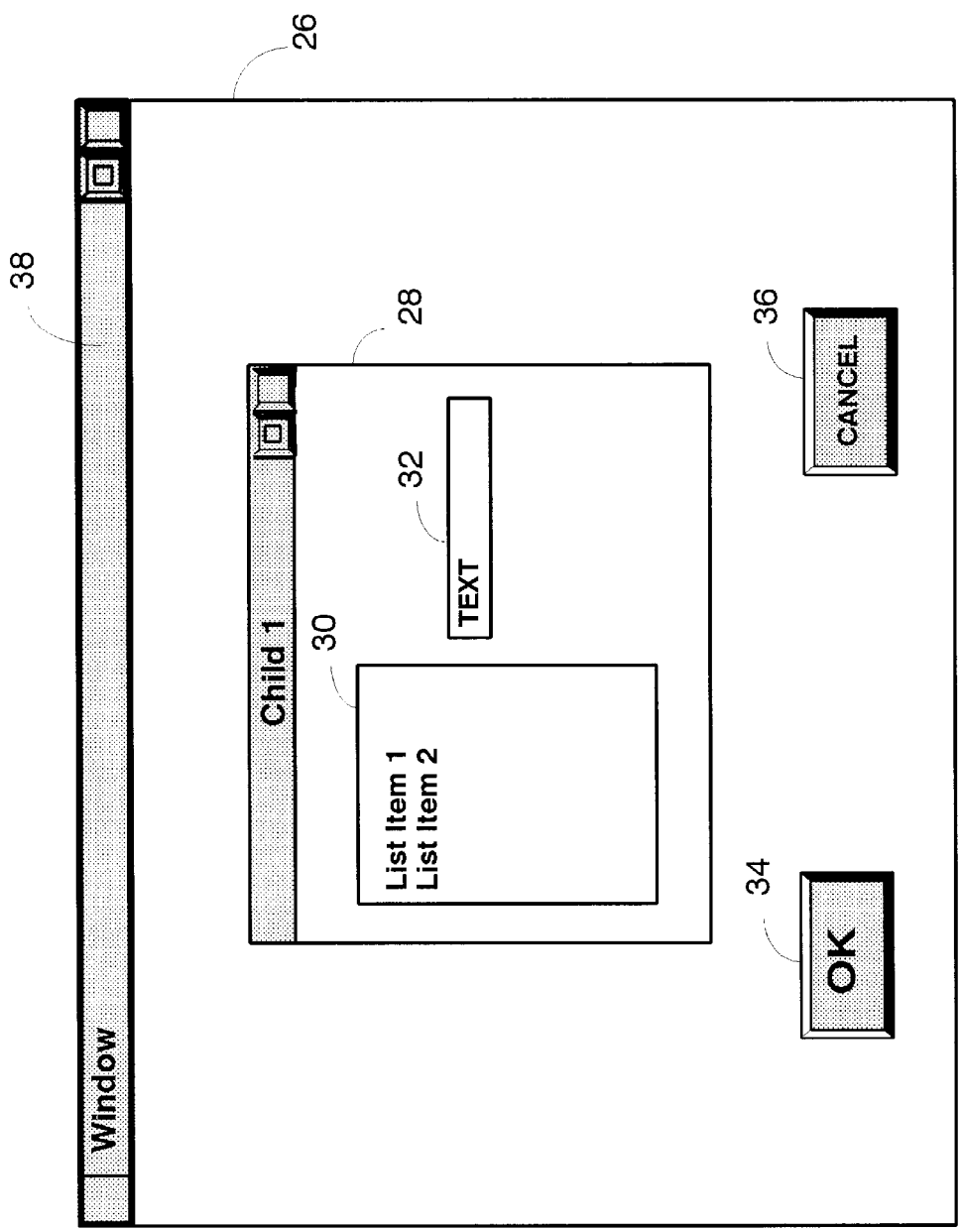
FIG. 1(A) is an example of a screen display for a top-level window object.

Each Windows based application contains one or more window objects. As used herein, the term Windows should be understood as referring to the Windows family of operating systems available from Microsoft Corporation. These include, but are not limited to 16-bit Windows, Windows NT™, and Windows 95™. The term "window object" refers to a combination of computer code and data which together comprise a sub-part of each Windows based application, which is presented to a user as part of a graphical user interface on a user interface screen. The computer code for each window object generally defines what is to be displayed in a window on a user interface screen (such as a VDT) when the window object is executed, and determines the precise manner in which the window object will respond to user inputs. Each window object can contain one or more additional window objects. For example, a window object for an application program may contain therein, additional window objects such as buttons, text boxes, edit boxes, dialog boxes, etc. FIG. 1(A) illustrates a typical screen display for a top-level window object containing several additional window objects which are children of the top level window object.

When a conventional speech navigator is used in conjunction with an application program, it will permit a user to operate program controls and/or make selections from the various buttons, list boxes, edit boxes, etc., which appear within a window object which currently is the foreground window. In a Windows based operating system, a window object is indicated to be the foreground window when its window bar 38 is highlighted. The window object which is the foreground window is usually the one from which the user has most recently requested some action of the application program. It should be noted, however, that other types of operating systems may indicate the window which is the foreground window by other means and may have somewhat different criteria for determining which window is the foreground window. Thus, it should be understood that the invention is not limited in this regard.

According to a preferred embodiment of the invention, an internal representation of a particular target application program is preferably developed in the form of a hierarchical tree. This process is preferably performed by means of an analysis of a particular target application program for which a voice navigator system is to be used. The analysis occurs at several levels in order to sufficiently characterize the target application in a way that allows efficient voice navigation of the program. The hierarchical tree allows the voice navigator to have an internal representation of the manner in which every window object of a target application is associated with every other such object. For example, in FIG. 1 (A), the screen display shown is for a top-level window object 26 of a target application state. As used herein, the term "top-level window object" may be understood as referring to a window object which has no parent window object, other than the Windows desk-top. Within the top level window object 26 are various other child window objects. In FIG. 1 (A), these include a window object 28, and buttons 34, 36. In addition, list box 30, and edit box 32 are children of window object 28. However, a child window object may include any type of window object other than a top-level window, and the invention is not limited in this regard. FIG. 1 (B) is a simple example of a hierarchical tree for the top-level window object in FIG. 1 (A).

Figure 2:
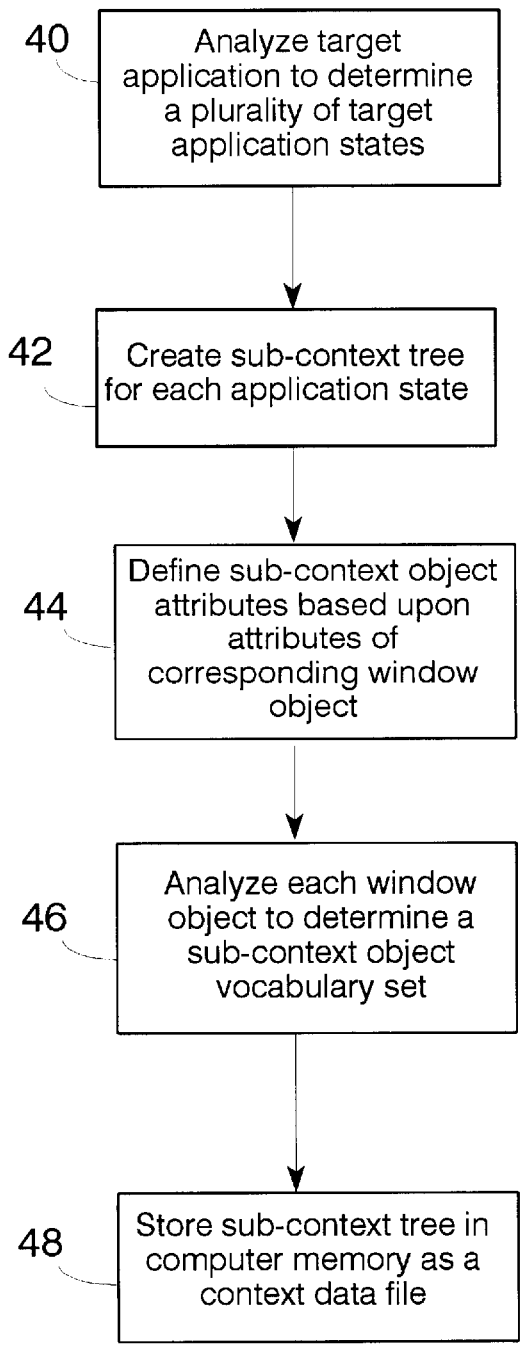
FIG. 2 is a flow chart illustrating the process for developing a sub-context tree for target applications according to the method of the invention.
Figure 3:
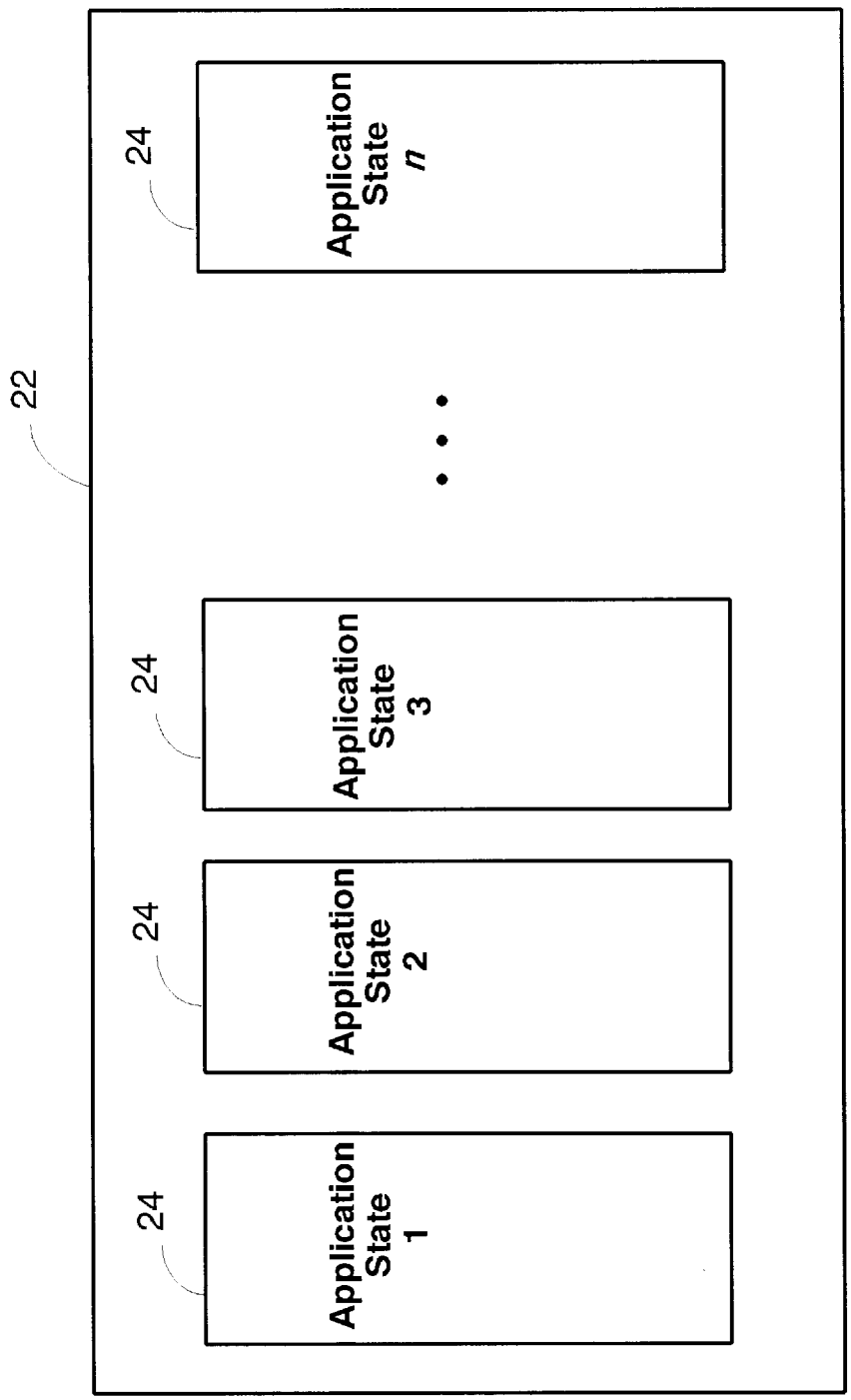
FIG. 3 is a block diagram showing an application program having a plurality of application states.

As shown in FIGS. 2 and 3, in order to develop a complete hierarchical representation of a target application 22, the target application is first analyzed in step 40 to determine a set of n application states 24. Each of the application states 24 is defined as a set of windows objects within the target application 22, which are generally associated with performing a specific user task. In a preferred embodiment according to the invention, the aforementioned plurality of application states 24 can be determined by a program developer alone or with the help of specifically developed software analysis tool.

The foregoing analysis can be performed in several ways, and the invention is not limited in this regard. In a preferred embodiment, the target application may be executed by a developer on a computer system, and by means of practices and methods which are well known to those familiar with this field, the developer will cycle the target application through all of its different states that represent a related group of user tasks. For each of the application states thus defined, software tools are preferably used to identify the window objects which comprise that particular state. This process will include identification of the parent-child relationship of the objects on the user interface screen, and the attributes of each object. The software tools which may be used for this purpose can be either commercially available programs designed for analyzing window attribute data, or custom programs specifically developed for performing such analysis.

Figure 4:
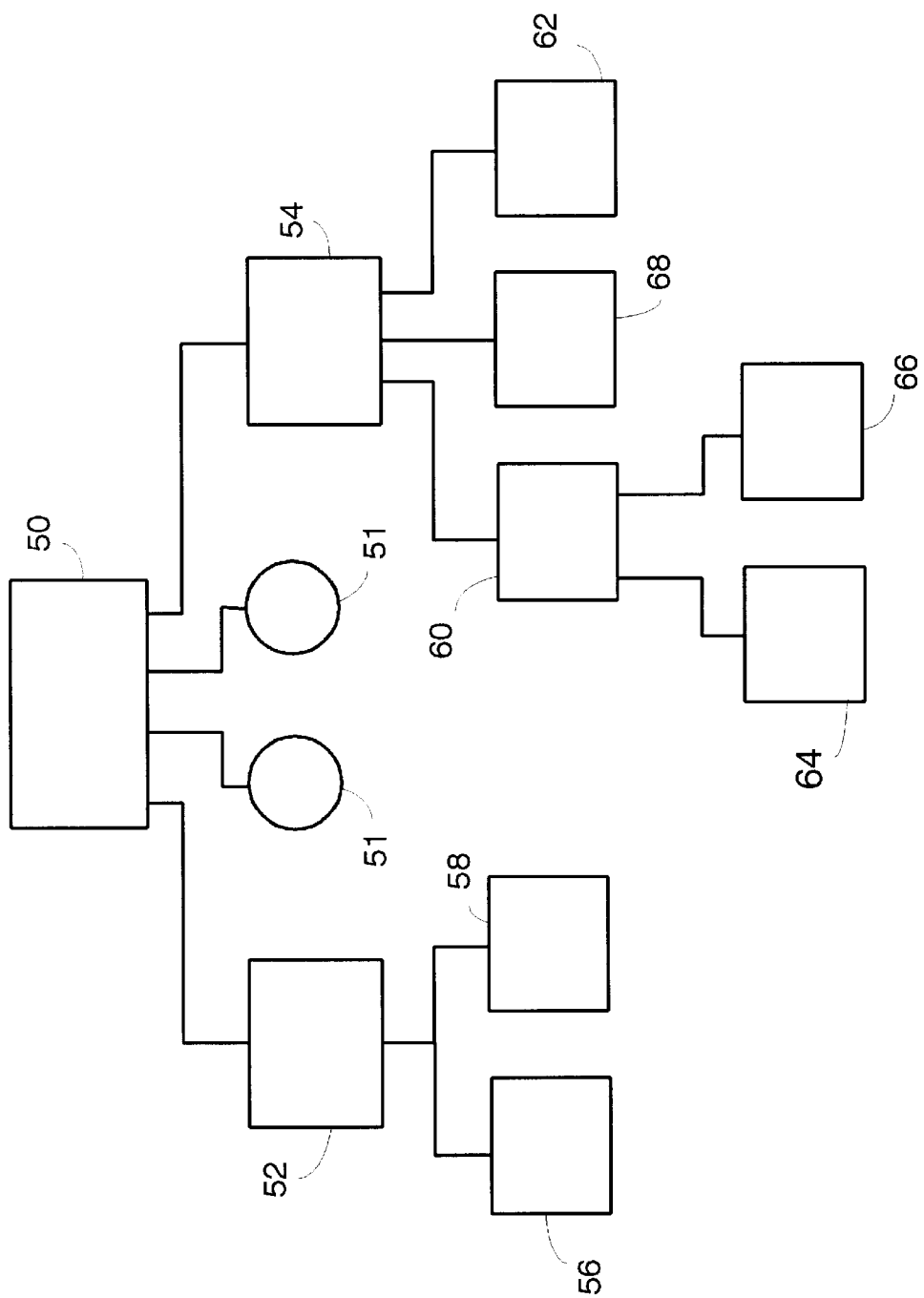
FIG. 4 is an example of a sub-context tree developed for one of the application states shown in FIG. 3.

In step 42, a target application sub-context tree is created for each application state 24. Each sub-context tree is preferably comprised of a plurality of sub-context objects. As explained in greater detail below, each sub-context object is preferably comprised of a data set which includes a plurality of sub-context attributes and a plurality of vocabulary sub-sets. In FIG. 4, a set of exemplary sub-context objects 50, 52, 54, 56, 58, 60, 62, 64, 66 and 68 are shown. The hierarchical relationship of the sub-context tree is chosen so that the parent-child relationship of the various sub-context objects is the same as the parent-child relationship between the window objects comprising each application state.

In addition, however, the sub-context tree may be designed so as to include additional branches with special sub-context action objects 51, which do not directly parallel the hierarchical parent-child relationship of any corresponding window objects. The sub-context action objects 51 include a set of attributes describing actions which are independent of said window objects of the current application state. For example, such sub-context actions may be comprised of macros which simulate user interface events. These can include, but are not limited to, simulated key strokes such as page up, page down, and customized messages that a particular window object in the target application will respond to.

Figure 5A:
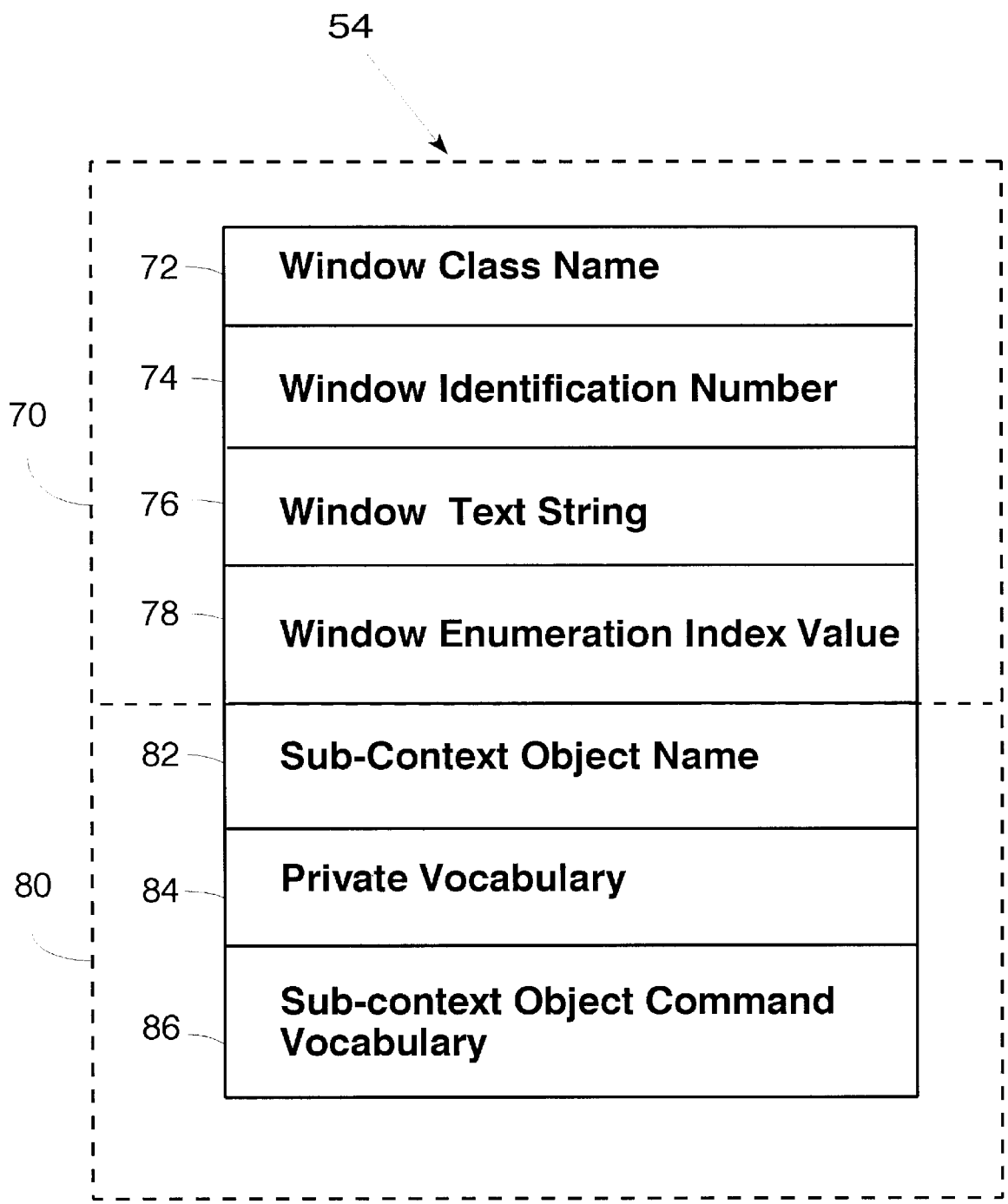
FIG. 5 is a representation of a sub-context object containing window attributes and a plurality of vocabulary sub-sets.
Figure 5B:
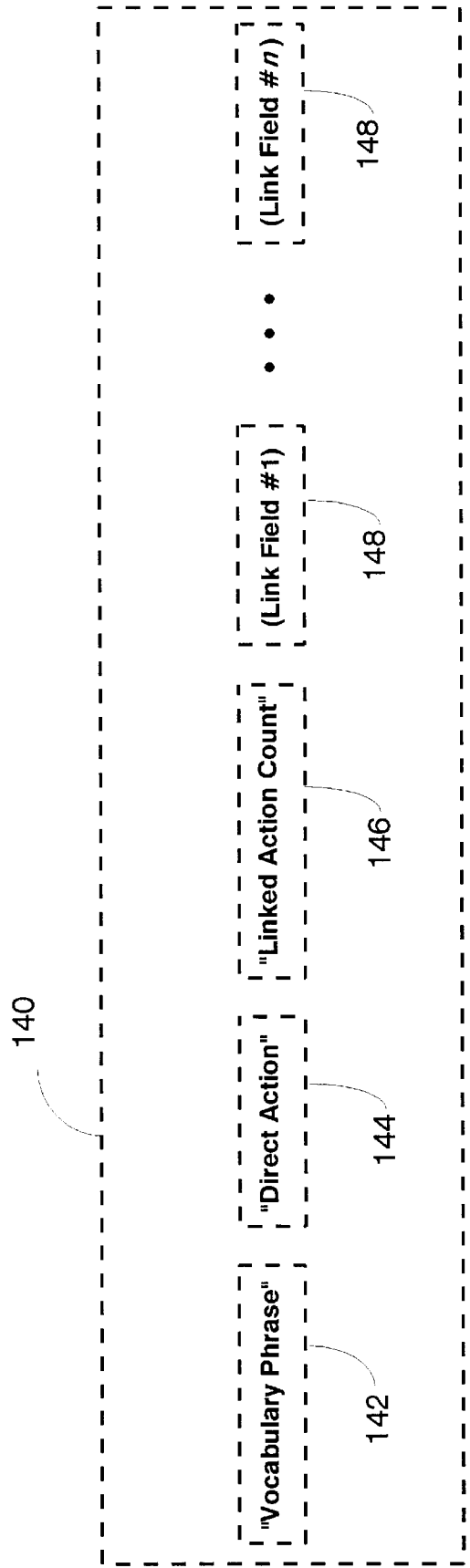
Figure 5C:
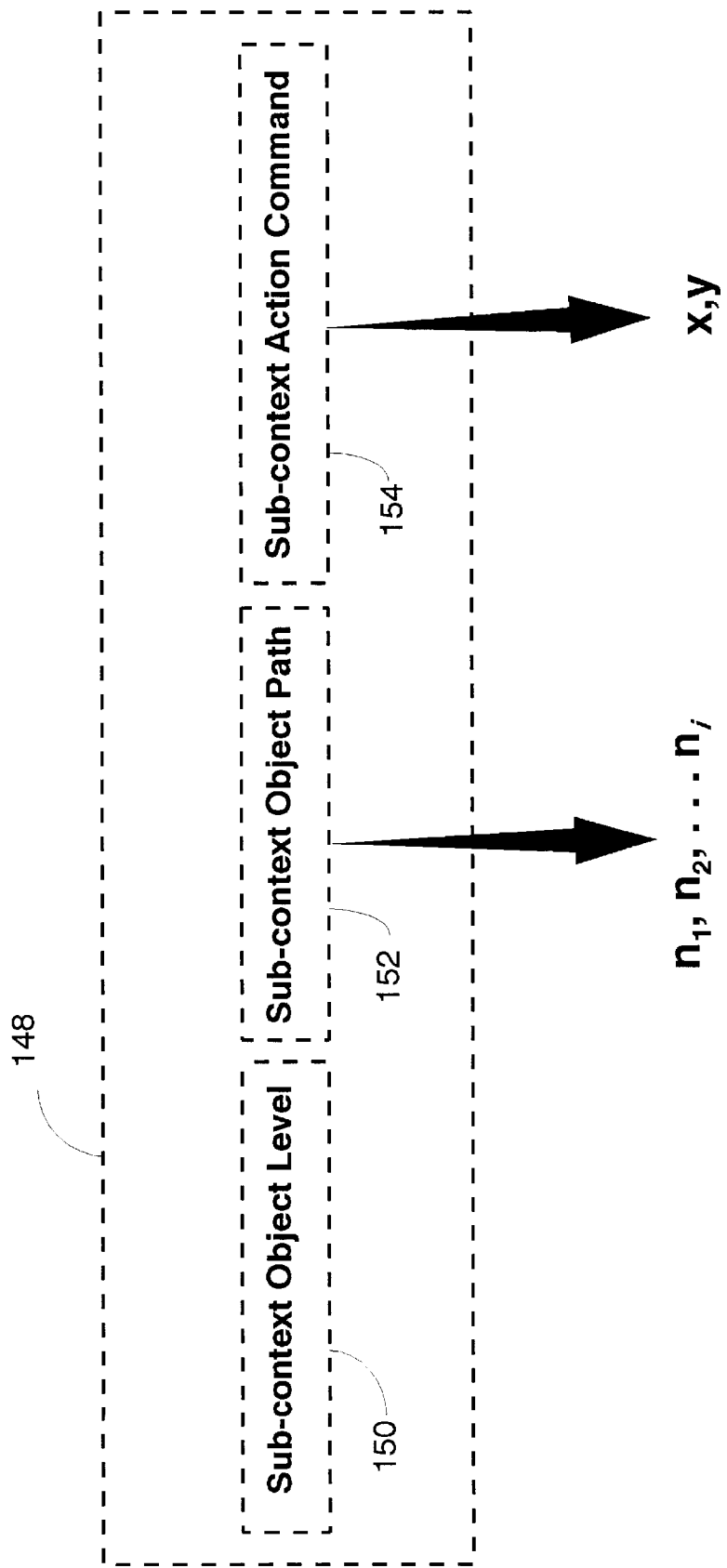

As the sub-context tree is created, a specific set of attributes 70 is defined for each of the sub-context objects based upon the attributes of a corresponding window object of the current application state. This process is illustrated in FIG. 2 as step 44. These attributes can include, but are not limited to a window class name 72, a window identification number 74, a window text string 76, and a window enumeration index value 78, as shown in FIG. 5. The window enumeration index value referenced above is the ordinal value of a child window in relation to its siblings. FIG. 5 is an example of a single sub-context object 54 which contains the foregoing attributes. However, it should be understood that each of the sub-context objects preferably contains similar information.

In addition to the foregoing analysis, each window object of the target application program is preferably analyzed to determine specific information regarding its functions. Each of the custom developed window objects of a target application is preferably mapped to a particular class or type of standard internal object which is understood by the voice navigator. For example, a developer may choose to develop a custom window object to replace a standard type of control such as a "BUTTON", "EDIT BOX", "LISTBOX", or "SCROLLBAR". If the custom control responds to the same messages and/or user inputs as a standard control, it is appropriate to treat the custom control as a standard control. In such cases the custom control can be mapped, by means of information stored in the sub-context object, to one of the standard controls. Thus, the navigator can operate the control in the same manner as it would the standard control. This is an especially important feature of the present invention as it concerns custom designed window objects which may have been implemented by the target application developer, but are not otherwise recognizable by a navigator program as a particular class or type of object. In particular, it avoids the need to write additional navigator computer code for handling the special or custom design controls implemented in a particular target application.

In addition to defining the foregoing sub-context attributes 70, each window object is preferably analyzed to discover a vocabulary set 80. More particularly, each window object is preferably analyzed to determine an appropriate set of spoken commands which must be uttered by a user in order to activate or act upon the object. This process is illustrated in FIG. 2 as step 46.

The sub-context object vocabulary set 80 is comprised of a series of vocabulary sub-sets. Each vocabulary sub-set is comprised of one or more vocabulary words or phrases (hereinafter "vocabulary phrase") corresponding to specific user inputs when a particular window object is the foreground window. These are the user inputs which must be recognizable by the voice navigator for the purpose of controlling the target application 22. As shown in FIG. 5, the sub-context object vocabulary set 80 preferably includes (1) a sub-context object name 82, which is the spoken command for activating the window object represented by the sub-context object; (2) a private vocabulary 84, which is active when the window object represented by the sub-context object is the foreground window; and (3) a sub-context object command vocabulary 86. The sub-context object command vocabulary corresponds to spoken navigation commands for window objects which are treated by the navigator as active, although the associated window object is not the foreground window. This is an important aspect of the present invention, as it allows the navigator to respond to commands for window objects which are not presently the foreground window. Upon completion of the foregoing analysis, each of the sub-context trees is stored in an electronic memory device as a context data file in a computer system. This process is illustrated in FIG. 2 as step 48.

Figure 6:
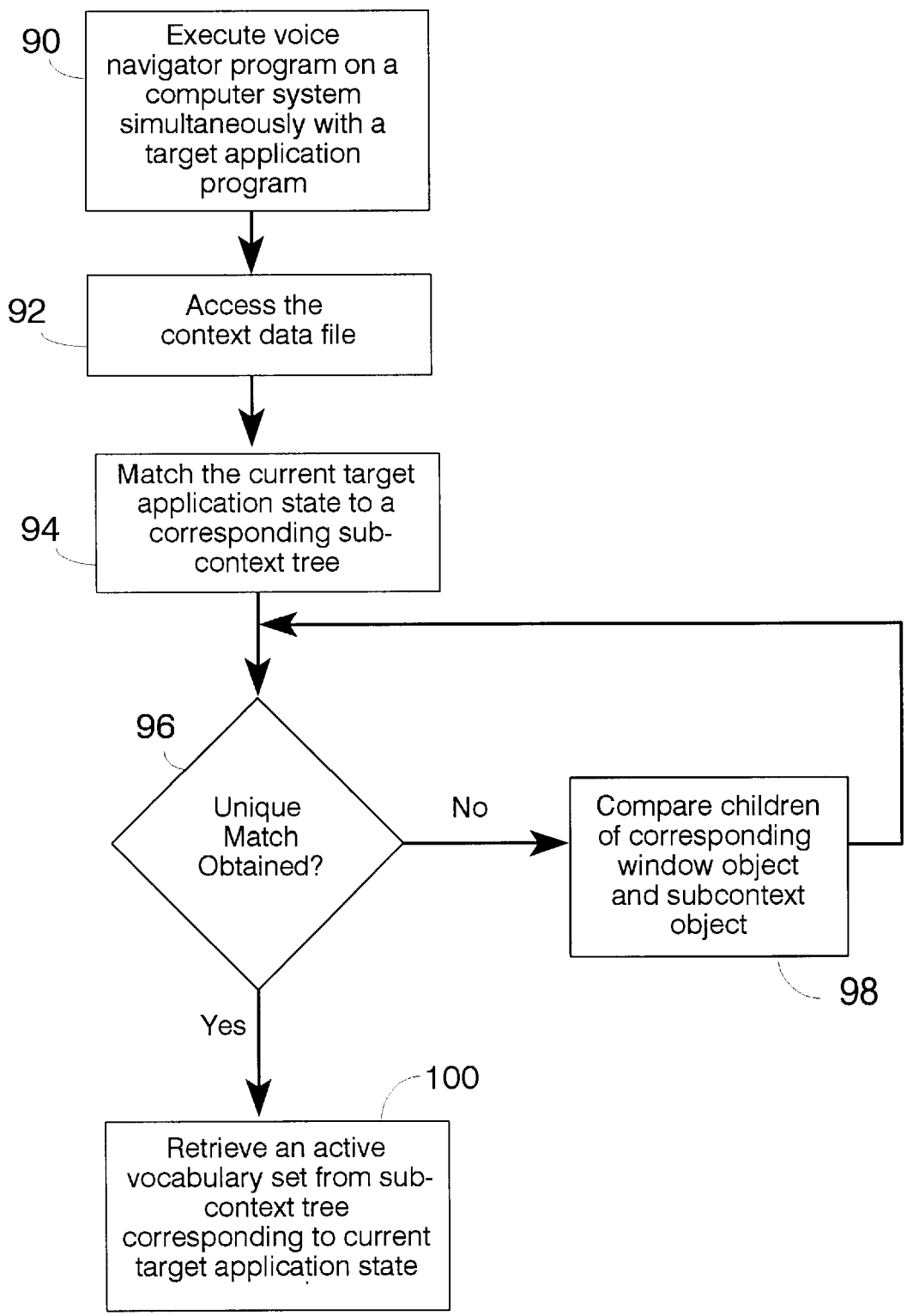
FIG. 6 is a flow chart showing the manner in which a voice navigator program makes use of a context data file.

The basic purpose of developing the foregoing context data file is to enable the navigator to associate decoded spoken commands to specific window objects. FIG. 6 is a flow chart which illustrates the manner by which a voice navigator program makes use of the context data file. As shown in FIG. 6, the voice navigator program is preferably executed on a computer system simultaneously with the target application program in step 90. In step 92, the voice navigator program accesses the context data file to retrieve information stored in the sub-context trees concerning the structure, attributes and vocabulary associated with the target application program. This information is used in step 94 to attempt to match a current target application state to a corresponding sub-context tree to determine an active vocabulary which has been defined for the current target application state. The matching step 94 is preferably performed first by attempting to match a window object from the current application state to a first or top-level sub-context object from each of the sub-context trees. More specifically, the navigator program attempts to match a sub-set of window attributes of the top-level window object of the target application program, to a set of attributes of one of the top-level sub-context objects contained within the sub-context tree. In some cases, the navigator will locate a unique and unambiguous match. In other cases, however, it will be impossible for the navigator program to uniquely and unambiguously match a window object to its corresponding sub-context object. This can occur under circumstances where two window objects, and two corresponding sub-context objects, share a common set of attributes. In such cases, the outcome of decision step 96 will be negative and the navigator will proceed further by attempting to obtain a unique match in step 98. In step 98, the navigator compares a set of window objects which are children of the top-level window object to a set of sub-context objects which are children of the top-level sub-context object. As shown in FIG. 6, the navigator continues to compare the respective children of the window object and the sub-context object until a unique match is found.

Figure 7:
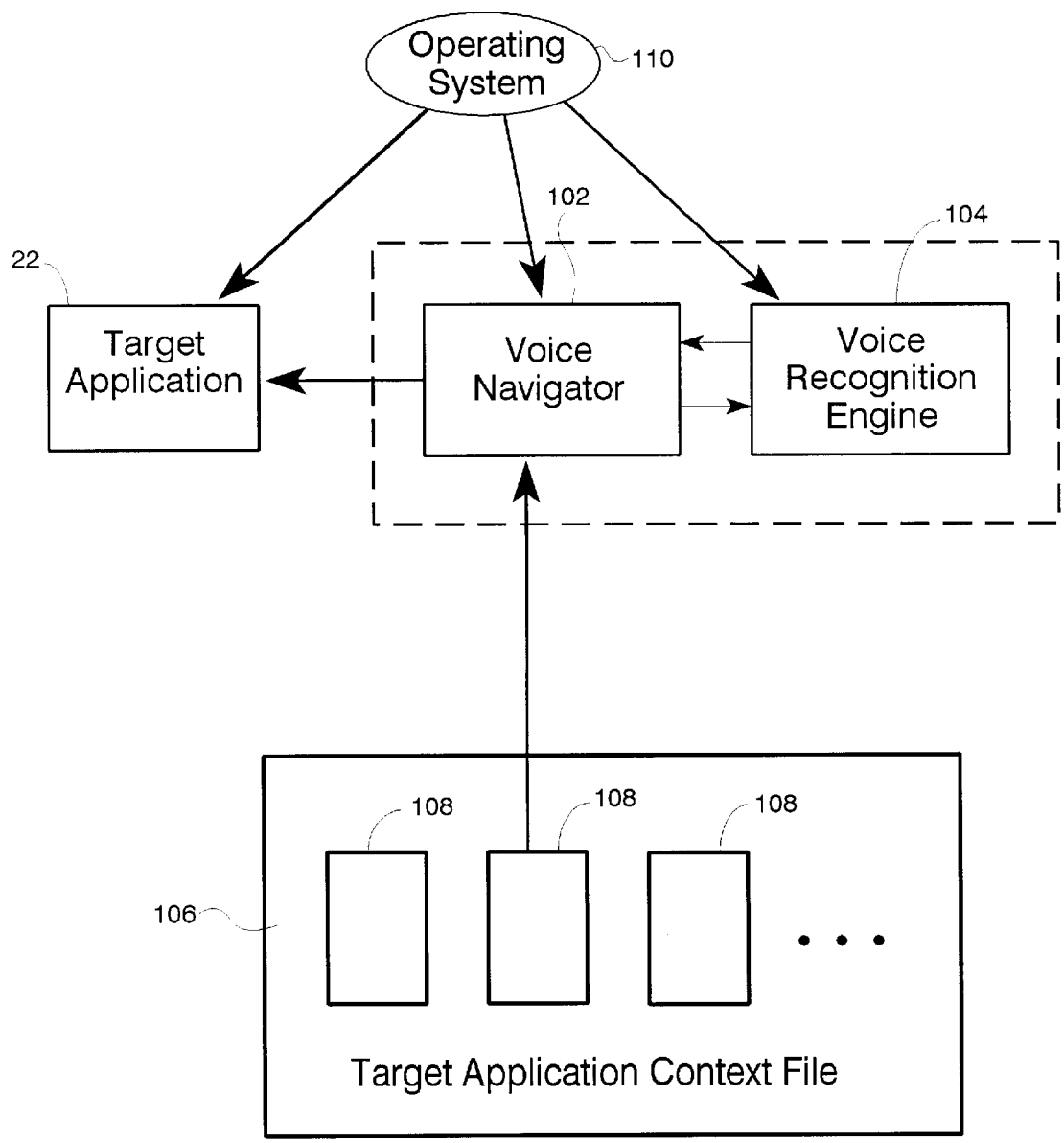
FIG. 7 is a block diagram showing the interaction between a voice navigator program, voice recognition engine and a target application context file.

Finally, in step 100 an active vocabulary set is obtained from the sub-context tree which corresponds to a current application state. This step is illustrated in FIG. 7, which is a block diagram showing the interaction between a voice navigator 102, voice recognition engine 104, target application context file 106, and target application 22. According to a preferred embodiment of the invention, an active vocabulary set for the current target application state is obtained by retrieving and combining one or more sub-context object vocabulary sets 80 contained within each sub-context object of a current sub-context tree 108.

Once the active vocabulary set has been retrieved by the voice navigator 102, it is preferably provided to the voice recognition engine 104. The voice recognition engine software preferably operates in conjunction with the voice navigator software and can be part of the same application program. The voice recognition engine 104 receives audio information which is passed to it by the operating system 110. Typically, such audio information is received by the operating system from an audio driver board which is electronically coupled to a microphone. Upon recognizing a spoken utterance which is part of the active vocabulary, the voice recognition engine 104 provides to the voice navigator a decoded phrase which is an element of the active vocabulary set. In addition to the decoded phrase, the voice recognition engine can preferably provide other types of information to the voice navigator, which can be used to for aiding the voice navigator in determining how the decoded phrase is to be used.

Figure 8A:
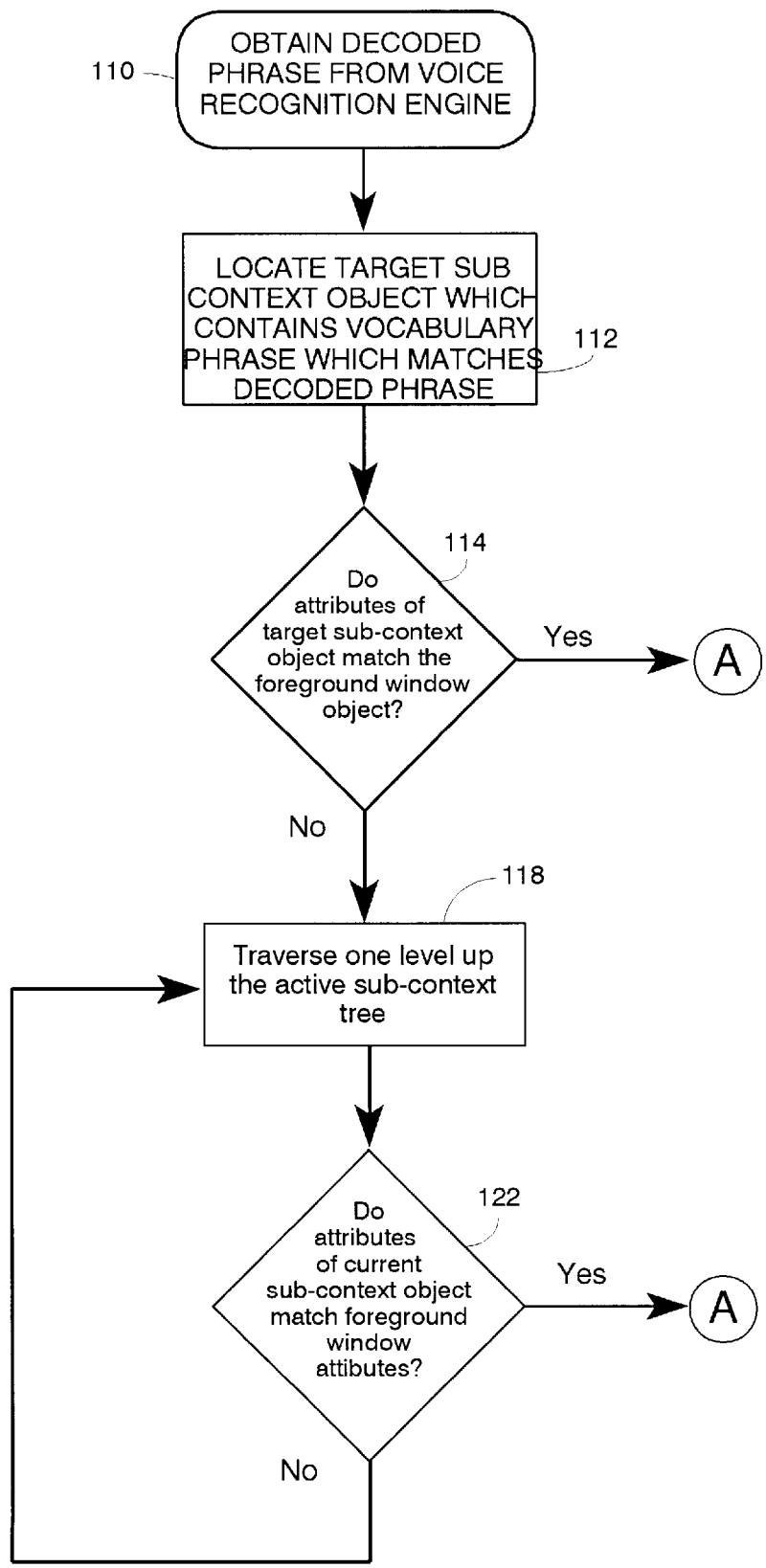
FIG. 8(a) is a flow chart showing the process by which a voice navigator according to the present invention can locate a target window object, based upon a decoded phrase.

As shown in FIG. 8, after receiving the decoded phrase in step 110, the voice navigator program matches it in step 112 with the sub-context object in the current application state containing a vocabulary element (a word or combination of words) corresponding to the decoded phrase. This process may be accomplished in various ways, and the invention is not limited in this regard. However, in a preferred embodiment, the navigator will perform a prioritized search, wherein the private vocabulary 84 corresponding to the foreground window object is checked first for a vocabulary word which matches the decoded word or phrase received from the voice recognition engine. Subsequently, the voice navigator will preferably compare the decoded word or phrase against the sub-context object name 82 and the sub-context object command vocabulary 86. Finally, the navigator will search all of the remaining sub-context object names 82 for other sub-context objects in the current sub-context object tree.

Once the navigator has matched the decoded word or phrase to a particular target sub-context object, the desired action represented by the decoded phrase within the sub-context object must be performed by the navigator 102. This is accomplished by associating the target sub-context object to a window object of the current application state to obtain a unique window handle.

In a preferred embodiment, the window handle for the window object which corresponds to the target subcontext object is determined as shown in FIG. 8(*a*) and (*b*). In step 114, the navigator compares the attributes of the target sub-context object with the attributes of the foreground window. In order to understand what is meant by the term "foreground window", it is helpful to have some background regarding the concept of z-order and the manner in which the Windows operating system organizes the various window objects which may appear on a user interface screen. The z-order of a window identifies a window object's position in a stack of overlapping windows on the user interface screen. The window stack is oriented along an imaginary axis, extending outwardly from the screen. The foreground window is the window at the top of the z-order. It is the window that the user is working with at a particular moment.

If the attributes of the target sub-context object do not match the attributes of the foreground window, the navigator traverses up 1 level of the active sub-context tree in step 118, to the parent of the target sub-context object. The attributes of this next higher level sub-context object are then compared to the foreground window's attributes in step 119. Again, if there is no match, the process of traversing up the active sub-context tree to the parent object is repeated until a foreground sub-context object which matches the foreground window, is found.

Figure 8B:
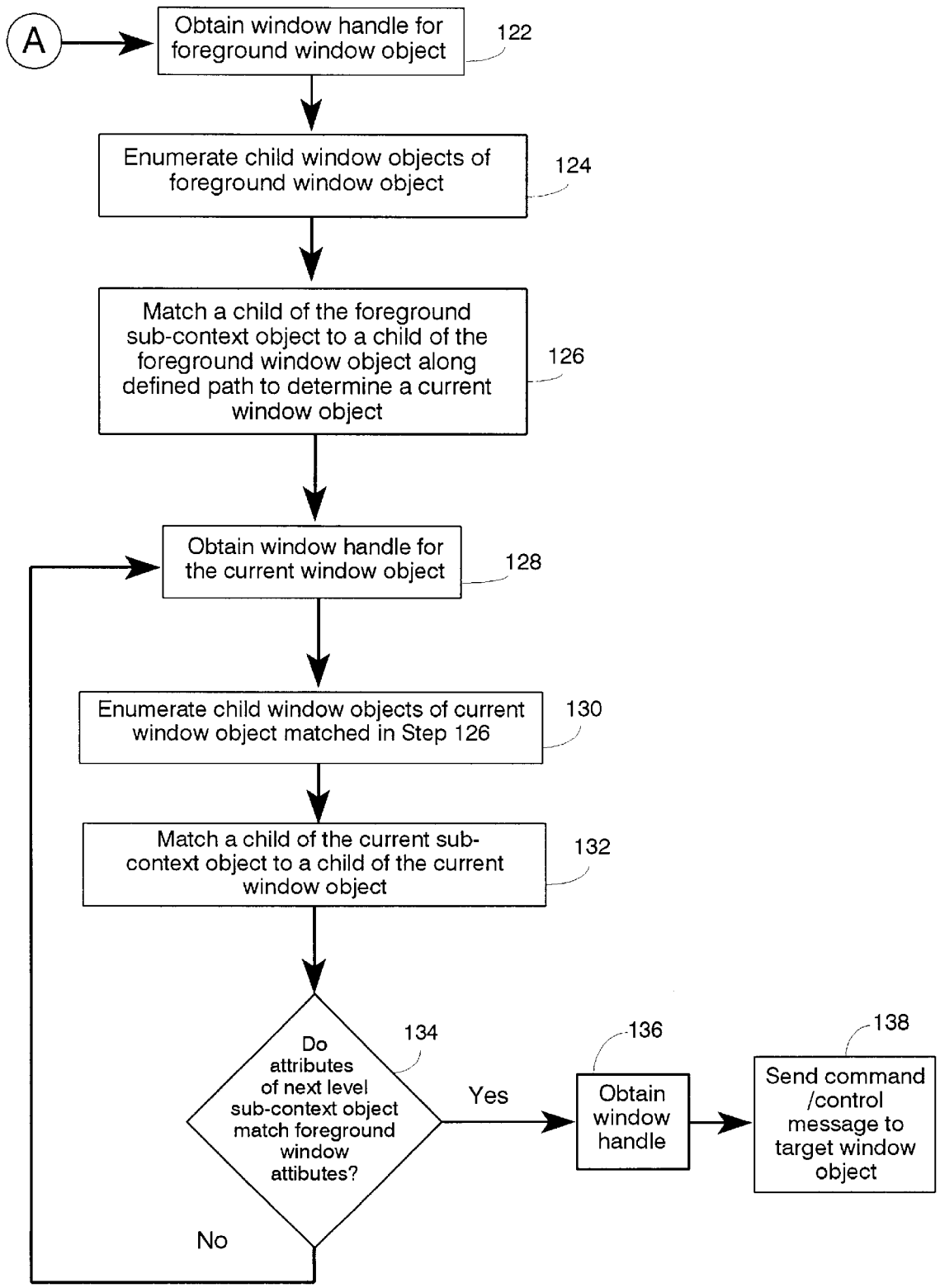
FIG. 8(b) is a continuation of the flow chart of FIG. 8(a).

As the navigator traverses up the sub-context tree, the path between the nodes defined by the target sub-context object and the foreground subcontext object is stored. This can be accomplished by various means and the invention is not limited in this regard. For example the navigator may rely upon recursive function calls or a stack data structure maintained by the navigator program to create a record of the path which has been traversed. Once this path has been established, the navigator begins traversing its way back down the sub-context object tree on the path previously defined, as shown in FIG. 8(b).

As the navigator traverses the defined path away from the foreground sub-context object, each sub-context object along the defined path is matched to its associated windows object, which is a descendent of the foreground window. In step 122, the navigator obtains a window handle for the foreground window object. Using this information, the navigator can utilize available operating system functions to enumerate the child window objects of the foreground window in step 124. The navigator then matches the child sub-context object along the defined path to a child of the foreground window object to determine a current window object in step 126. The enumeration and matching process is repeated in steps 128, 130 and 132 for each descendent of the foreground window along the defined path. As each level of the tree is downwardly traversed by the navigator, it checks to determine whether the current window object matches the target window object. If it is, then the window handle for that target window object is obtained in step 136.

Once the window handle has been obtained for the window object which corresponds to the target sub-context object, the navigator can invoke the function associated with the spoken command by sending one or more messages to the associated window object, using the acquired window handle. This process is shown in step 138. The specific types of messages which the navigator sends will depend upon the particular window object and the spoken utterance.

The matching step described above is preferably accomplished by comparing the attributes of each descendant sub-context object to the attributes of each of the enumerated descendent window objects. No ambiguity among child or descendent windows occurs in this instance because the navigator's combined knowledge regarding window object attributes and the window object's specific parent, allows each child window object to be uniquely determined.

It should be noted that the window handle is an essential piece of information which is necessary to allow the associated window object to be uniquely identified by the operating system. The window handle is a dynamic, instance specific, operating system identification number, which permits a window object to be uniquely identified within the operating system at any given moment in the execution of the target application.

As an example of the foregoing process, consider the case where the target sub-context object is sub-context object 66. The navigator will first traverse the sub-context tree upwardly from sub-context object 66, one level at a time, until it finds a match between a sub-context object and the current foreground window object. For the purposes of the present example, this would be sub-context object 50. The navigator searches for the current foreground window object first because it is the only window handle which is easily accessible. However, once provided with the window handle of the foreground window object, the navigator traces its way back down the sub-context object tree along the same path, at each level requesting the window handle for the child windows objects. This process is repeated until the window handle is obtained for the window object pertaining to the window object corresponding to the target sub-context object 66.

A navigator which is provided with information as described above offers distinct advantages over other systems which merely attempt to dynamically characterize object attributes and methods, and have no information regarding object hierarchy or attributes. A navigator provided with the object hierarchy and attributes according to the present invention, offers improved usability because the command vocabulary which is available is not limited to a particular window which is currently the foreground window. Further, custom designed objects and controls which may be unrecognizable to conventional navigators, can be recognized with the present invention because they have been mapped to internal object types which are known to the navigator. Finally, the present method allows voice commands to be used with certain types of menu or tool bars which are never treated as the foreground window. Such objects have not been previously accessible through conventional voice navigators which rely upon a foreground window to determine an active command vocabulary.

In view of the foregoing, it should be apparent that the method according to the invention is designed to operate in conjunction with a computer system comprising a central processing unit, one or more electronic memory storage devices, data entry equipment such as a microphone, keyboard and mouse, and at least one user interface unit (e.g., CRT). The central processing unit (or CPU) is electronically coupled to the one or more electronic memory storage devices, data entry device and display unit by suitable means which are well know by those of ordinary skill in this field. Similarly, the CPU can be comprised of any suitable microprocessor or other electronic processing unit as is well known to those skilled in the art. An example of such a processor would include the Pentium brand microprocessor available from Intel Corporation or any similar unit such as a 586, 486 or 386 type microprocessor.

The various hardware requirements for the computer system as described herein can generally be satisfied by any one of many commercially available high speed personal computers offered by manufacturers such as Compaq, Hewlett Packard, or IBM Corp. Likewise, the system as disclosed herein can be implemented by a programmer using development tools for the operating systems described above.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

We claim:

1. Method for representing a target software application program to a voice recognition navigator program on a computer system, said method comprising:

analyzing an application program to determine a plurality of application states, each of said application states being comprised of a plurality of window objects;

organizing each of said application states in the form of a sub-context tree, each of said sub-context trees being comprised of a plurality of sub-context objects defining the hierarchical relationship among each of said sub-context objects;

determining a set of attributes associated with each of said window objects, and assigning a matching set of attributes to each of the sub-context objects;

storing the sub-context trees in a memory device of said computer system as a context data file;

executing said voice recognition navigator program on said computer system concurrently with said target application program;

analyzing said target application with said voice navigator program to determine a current target application state of said target application program and matching said current target application state to a corresponding sub-context tree by comparing a window object from the current target application state to at least one of said sub-context objects stored as part of said context data file;

defining an active vocabulary set for the current target application state by retrieving from said context data file at least one sub-context object vocabulary set.

2. The method according to claim 1 wherein matching of said current target application state to a corresponding sub-context tree is accomplished by matching a first window object from the current application state to a first sub-context object from the sub-context trees.

3. The method according to claim 2 wherein matching said first window object to a first sub-context object is accomplished by matching a sub-set of window attributes of said first window object to a set of attributes of a first one of said sub-context objects.

4. The method according to claim 3 further comprising the steps of matching a set of window objects which are children of said first window object to a set of sub-context objects which are children of said first sub-context object, when a unique match cannot be found by comparing the attributes of said first window object to said first sub-context object.

5. The method according to claim 1, wherein each of said application states is a set of window objects for performing a specific user task.

6. The method according to claim 1, wherein said plurality of application states are determined by:

a. executing the target application to display all of said application states; and b. for each application state of said application program, creating a target application sub-context tree comprised of a plurality of sub-context objects, the set of attributes of each of said sub-context objects being defined by the attributes of one of said window objects of the current application state.

7. The method of claim 6 wherein said sub-context tree is further comprised of sub-context action objects being defined by a set of attributes describing actions which are independent of said window objects of the current application state.

8. The method of claim 7 wherein said actions are comprised of macros which simulate user interface events.

9. The method of claim 1, wherein said target application sub-context tree is organized in a tree structure wherein the parent-child relationships between sub-context objects is the same as the parent-child relationships between the corresponding target application window objects.

10. The method according to claim 1, wherein said current target application state is matched to said corresponding sub-context tree by comparing their respective sets of attributes, and said sets of attributes are comprised of at least one of:

a. a window class name;

b. a window identification number;

c. a window text string; and d. a window enumeration index value.

11. The method according to claim 1, wherein said active vocabulary set for the current target application state is created by retrieving and combining all vocabulary sets from each sub-context object of the current sub-context tree.

12. The method according to claim 11, wherein said vocabulary set for each sub-context object is comprised of the following vocabulary sub-sets which correspond to spoken commands which are understood by the voice navigator:

a. a sub-context object name which is the spoken command associated with activating the window object represented by the sub-context object;

b. a private vocabulary which is active when the window object represented by the sub-context object is the foreground window;

c. a sub-context object command vocabulary for window objects which are treated by the navigator as active, although the associated window object is not the foreground window.

13. The method according to claim 1 further comprising the steps of a. providing the active vocabulary to a voice recognition engine;

b. receiving from said voice recognition engine a decoded phrase which is an element of the active vocabulary, and which matches a user voice utterance.

14. The method according to claim 1 wherein a decoded phrase which is an element of the active vocabulary is received by said voice navigator program, and said voice navigator program associates said decoded phrase with a matching target sub-context object containing a vocabulary element corresponding to said decoded phrase.

15. The method according to claim 14 further comprising the step of executing the desired action represented by the decoded phrase within the target sub-context object.

16. The method according to claim 15 wherein said step of executing said desired action represented by the decoded phrase is performed by matching said target sub-context object to a target window object of the current application state.

17. The method according to claim 16 wherein said matching of said sub-context object to a window object is performed by the steps of:

defining a path between said target sub-context object and a foreground sub-context object by traversing up said sub-context tree one level at a time, beginning with said target sub-context object, and comparing the attributes of each of said sub-context objects along said path to the attributes of a foreground window object until a match is determined;

traversing down said path, one level at a time, beginning with said foreground sub-context window object, matching at each level the attributes of one of said sub-context objects to a corresponding window object which is a descendent of the previously matched window object, until a target window object is identified.

* * * * *